United States Patent
Martini

(10) Patent No.: US 9,792,445 B2
(45) Date of Patent: Oct. 17, 2017

(54) METHOD AND END DEVICE FOR SECURELY INPUTTING ACCESS CODE

(71) Applicant: GIESECKE & DEVRIENT GMBH, Munich (DE)

(72) Inventor: Ullrich Martini, Munich (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 0 days.

(21) Appl. No.: 14/769,497

(22) PCT Filed: Feb. 25, 2014

(86) PCT No.: PCT/EP2014/000494
§ 371 (c)(1),
(2) Date: Aug. 21, 2015

(87) PCT Pub. No.: WO2014/131511
PCT Pub. Date: Sep. 4, 2014

(65) Prior Publication Data
US 2015/0371050 A1    Dec. 24, 2015

(30) Foreign Application Priority Data

Feb. 26, 2013    (DE) .................. 10 2013 003 205

(51) Int. Cl.
*G06F 21/00* (2013.01)
*G06F 21/60* (2013.01)
(Continued)

(52) U.S. Cl.
CPC .............. *G06F 21/60* (2013.01); *G06F 21/31* (2013.01); *G06F 21/556* (2013.01); *G06F 21/83* (2013.01);
(Continued)

(58) Field of Classification Search
CPC ........ G06F 21/60; G06F 21/31; G06F 21/556; G06F 21/83; G06F 21/84; H04M 1/67;
(Continued)

(56) References Cited

U.S. PATENT DOCUMENTS 8,612,767 B2*  12/2013  Gossweiler, III ..... G06F 21/556
                                                      455/1
9,253,209 B2*   2/2016  Muppidi ................ H04W 12/08
(Continued)

FOREIGN PATENT DOCUMENTS

DE    10231870 B4    9/2008
EP     2136536 A1   12/2009
(Continued)

OTHER PUBLICATIONS

Cai et al., "Defending Against Sensor-Sniffing Attacks on Mobile Phones," Proceedings of the 1st ACM Workshop on Networking, Systems, and Applications for Mobile Handhelds, Mobiheld, Jan. 1, 2009, pp. 31-36.
(Continued)

*Primary Examiner* — Sharon Lynch
(74) *Attorney, Agent, or Firm* — Workman Nydegger

(57) ABSTRACT

The invention provides a method for securely inputting an access code to an input interface of a mobile end device. During an input time period covering the process of inputting the access code, at least one or some sensors of the end device that are uninvolved in the input of the access code, said sensors being respectively arranged for capturing sensor variables by sensor, are hindered from capturing and/or passing on the respective sensor variable. Possible sensors are acceleration sensors or a digital camera. The method prevents the access code from being spied out by means of the deactivated sensors.

10 Claims, 1 Drawing Sheet

(51) Int. Cl.
  *G06F 21/55* (2013.01)
  *H04M 1/67* (2006.01)
  *H04W 12/12* (2009.01)
  *G06F 21/31* (2013.01)
  *G06F 21/83* (2013.01)
  *G06F 21/84* (2013.01)
  *H04W 88/02* (2009.01)

(52) U.S. Cl.
  CPC .............. *G06F 21/84* (2013.01); *H04M 1/67* (2013.01); *H04W 12/12* (2013.01); *H04M 2250/12* (2013.01); *H04M 2250/52* (2013.01); *H04W 88/02* (2013.01)

(58) Field of Classification Search
  CPC ......... H04M 2250/12; H04M 2250/52; H04M 88/02; H04W 12/12
  See application file for complete search history.

(56) References Cited

U.S. PATENT DOCUMENTS

| | | | | |
|---|---|---|---|---|
| 9,275,093 B2* | 3/2016 | Pandey | ............ | G06F 17/30333 |
| 9,424,409 B2* | 8/2016 | Buck | ................... | G06F 21/31 |
| 9,449,482 B2* | 9/2016 | Piel | ................. | G08B 13/19676 |
| 2004/0064711 A1* | 4/2004 | Fernando | ............... | G06Q 20/20 |
| | | | | 713/189 |
| 2007/0101148 A1* | 5/2007 | Schutz | ................... | G06F 21/57 |
| | | | | 713/182 |
| 2011/0320823 A1* | 12/2011 | Saroiu | ..................... | G06F 21/53 |
| | | | | 713/189 |
| 2012/0013744 A1* | 1/2012 | Piel | ..................... | G08B 25/008 |
| | | | | 348/153 |
| 2012/0222083 A1* | 8/2012 | Vaha-Sipila | .......... | H04L 63/102 |
| | | | | 726/1 |
| 2013/0047197 A1* | 2/2013 | Saroiu | ................. | G06F 21/6209 |
| | | | | 726/1 |
| 2013/0111597 A1* | 5/2013 | Gossweiler, III | ..... | G06F 21/556 |
| | | | | 726/26 |
| 2013/0174211 A1* | 7/2013 | Aad | ...................... | G06F 21/604 |
| | | | | 726/1 |
| 2014/0098141 A1* | 4/2014 | Sen | ..................... | G06F 3/04886 |
| | | | | 345/660 |
| 2014/0157349 A1* | 6/2014 | Robinson | ........... | G06K 9/00228 |
| | | | | 726/1 |
| 2014/0196158 A1* | 7/2014 | Buck | ...................... | G06F 21/31 |
| | | | | 726/30 |
| 2014/0223550 A1* | 8/2014 | Nagar | .................... | G06F 21/31 |
| | | | | 726/19 |
| 2015/0350255 A1* | 12/2015 | Robinson | ........... | G06K 9/00228 |
| | | | | 726/1 |

FOREIGN PATENT DOCUMENTS

| | | |
|---|---|---|
| EP | 2629221 A1 | 8/2013 |
| WO | 2013063268 A1 | 5/2013 |

OTHER PUBLICATIONS

Cai et al., "TouchLogger: Inferring Keystrokes on Touch Screen from Smartphone Motion," Proceedings of the 6th Usenix Conference on Hot Topics in Security: Series Hotsec '11, Aug. 9, 2011, 6 pages.

International Search Report for corresponding International PCT Application No. PCT/EP2014/000494, May 23, 2014.

Owusu et al., "ACCessory: Password Inference Using Accelerometers on Smartphones," Proceedings of the Twelfth Workshop on Mobile Computing Systems and Applications, Feb. 29, 2012, 6 pages.

* cited by examiner

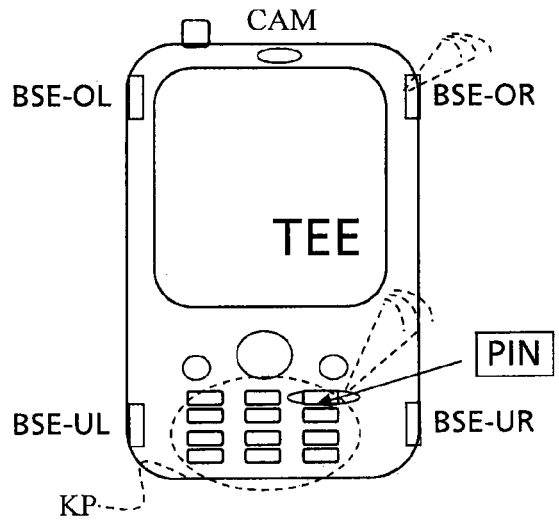
Fig. 1
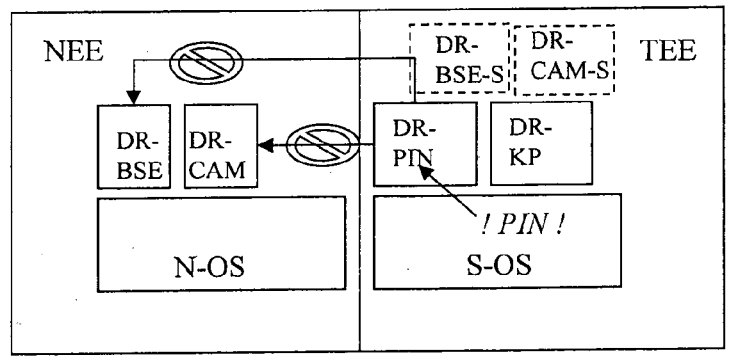
Fig. 2
Fig. 3

METHOD AND END DEVICE FOR SECURELY INPUTTING ACCESS CODE

BACKGROUND

This invention concerns a method for securely inputting an access code to an input interface of a mobile end device.

Most mobile end devices such as mobile telephones, smartphones and the like are access-protected by an individual access code, the PIN (personal identification number). The end device become usable only after the access code has been correctly inputted on an input interface of the end device. As an input interface there is provided e.g. a keyboard implemented in hardware (keypad), alternatively a touch-sensitive display (touchscreen) of the end device, in particular a keyboard displayable on the display of the end device (touchpad).

Particularly smartphones have a number of various sensors for sensing data while exploiting physical effects and for feeding applications runnable in the smartphone. For example, most smartphones have motion sensors which can capture motions of the smartphone in space. The captured motions can serve for example as input to a computer game, e.g. in the form of steering motions for an automobile or of an imaginary athlete's motions in a sport. With some end devices, shaking the end device can trigger certain actions in the file management, e.g. loading of another file, or the like. Most end devices have as a further sensor a digital camera which can acquire static images and films.

In EP 2 136 536 A1 it is proposed to utilize an acceleration sensor of a mobile end device in order to put the mobile end device into an operating state that matches motions of the user.

When inputting the access code, the user of an end device performs motions of his hands and in particular fingers that reflect the access to the keyboard keys corresponding to the individual digits of the access code. FIG. 2 shows an example of a conventional numeric block of a keyboard as can be provided on a mobile end device. The digit three ("3") is disposed in the upper right corner. When the user actuates the key three, he presses on the top right on the telephone relative to the actuating of other keys. An end device like that shown in FIG. 1 could have four motion sensors, namely, one at the top right, top left, bottom right and bottom left. When the key three disposed at the top right is actuated upon PIN input, the motion sensor disposed at the top right could show the strongest reaction in comparison to the actuation of other keys, since the key three is located nearest to the acceleration sensor at the top right. Upon actuation of the key three, a camera of the end device could recognize the user's finger or eyes in a position at the top right, or in a motion toward the key three. A microphone could also respond differently in dependence on the actuated key on the keyboard, as well as uninvolved contactless interfaces such as NFC or Bluetooth, or a GPS system. Sensors thus form potential side channels via which an access code such as a PIN might be spied out.

In principle, sensors, such as acceleration sensors, in end devices work in such a way that a sensor variable, e.g. the acceleration of the end device relative to the reference system (i.e. relative to the outside world) is captured by sensor and the captured acceleration is relayed to a microprocessor of the end device. The microprocessor processes the captured sensor data and can feed them to software of the end device, e.g. to a computer game or a file management, an application at the application level, or a driver at the hardware level which might e.g. switch the end device to the standby mode.

DE 102 31 870 B4 describes a method for securely inputting a PIN to a mobile end device wherein, while a user carries out a PIN input, sensor variables of sensors of the mobile end device are captured, the captured sensor variables are compared with prestored user-specific reference sensor variables, and the PIN is accepted only in case of a match between captured and reference sensor variables.

In principle, secure execution (or runtime) architectures are known, in particular two-tier execution (or runtime) architectures such as that from the company ARM (TrustZone architecture), having a normal execution environment and a trusted execution environment. In the trusted execution environment, security applications and security drivers (e.g. for peripheral devices such as a keyboard) are implemented under the management of a secure operating system.

SUMMARY

The invention is based on the object of providing a method for securely inputting an access code to an input interface of a mobile end device, and a corresponding end device.

The method according to claim 1 is provided for securely inputting an access code to an input interface of a mobile end device. The method is characterized in that, during an input time period covering the process of inputting the access code, at least one or some sensors of the end device that are uninvolved in the input of the access code, said sensors being respectively arranged for capturing a sensor variable by sensor, are hindered from capturing or passing on the respective sensor variable. Depending on the kind of sensor, the capturing, the passing on, or both, are prevented.

When the sensor or sensors are hindered from capturing the respective sensor variable during the input of the access code, peculiarities upon input that depend on the value of the access code cannot be reflected in the sensor variable. If a sensor variable is nevertheless generated, e.g. because the measurement is effected mechanically and cannot, or not readily, be switched off, the captured sensor variable is at least not relayed for evaluation, e.g. to the microprocessor of the end device, so that no information about the inputted access code can be spied out from the sensor variable. The side channel of the sensor variable for spying out the access code is cut off in both cases, prevention of capture of the sensor variable and prevention of relaying thereof.

There is thus provided according to claim 1 a method for securely inputting an access code to an input interface of a mobile end device.

A sensor can be hindered from capturing or relaying the sensor variable for example by separating the sensor from the supply of power or current or voltage, etc. A sensor separated from the power, current or voltage supply and that is designed as a camera cannot capture the sensor variable and moreover not relay it, thus being cut off in both respects. An acceleration sensor separated from the power, current or voltage supply and whose sensor variable is based on the measurement of a mechanical variable, e.g. oscillation, necessarily generates an acceleration value as a sensor variable through the mechanical motion of the end device, but the captured sensor variable is not relayed to the microprocessor for evaluation.

As a sensor there is electively provided at least one of the following: a motion sensor arrangement having one or more motion sensors, a camera arrangement having one or more cameras, a microphone arrangement having one or more microphones, a contactless interface, in particular NFC interface or Bluetooth interface.

Electively, all sensors of the end device that are uninvolved in the input of the access code are hindered from capturing or passing on the respective sensor variable. Thus, e.g. camera, acceleration sensors, contactless (e.g. NFC) interface are uninvolved in the input of an access code and their functionality is superfluous during the access code input. Upon a voice input of the access code a microphone is involved and required as a sensor, upon input via keyboard a microphone is uninvolved and superfluous.

Electively, every sensor that can be hindered from capturing can assume an activated state in which the sensor is able to capture and relay the sensor variable, and assume a deactivated state in which the sensor is unable to capture the sensor variable or unable to pass on (relay) the sensor variable. In the activated state the sensor is thus functional. In the deactivated state the sensor is not fully functional, either because it cannot capture the sensor variable or because it cannot pass on the sensor variable for processing to the microprocessor of the end device, or both. The sensor is hindered from capturing or relaying the sensor variable by the end device ensuring that the sensor has the deactivated state during the input time period.

Electively, upon the prompting of an access code input on the part of the end device, for every sensor that is hindered from capturing or relaying, the sensor is checked by the end device as to whether it is in the activated state or in the deactivated state. Where applicable, the sensor is deactivated or hindered from being activated.

Electively, there is provided as an input interface a keyboard, in particular a hardware keyboard having physical keys or a soft keyboard displayable on a touch-sensitive display of the end device.

Electively, there is provided as an access code a PIN, in particular a numerical PIN (PIN=personal identification number).

Electively, the end device comprises for every sensor a sensor driver, with the sensor driver being at least partly or completely deactivated to hinder the sensor from capturing or passing on.

Electively, the sensor or sensors are hindered from capturing the respective sensor variable by security software implemented in a trusted execution environment of the end device, in particular by a security application or a security driver. By this means the sensor hindrance (e.g. deactivation) is protected from abuse. In particular, this prevents the protective measure from being eliminated through malware such as viruses or Trojans unnoticed by the user.

A mobile end device according to the invention comprises an input interface via which an access code is inputtable, at least one sensor, and moreover a device for hindering sensors of the end device from capturing or relaying their sensor variable while an access code is inputted on an input interface of the end device.

In the end device there is electively provided as a sensor at least one of the following: a motion sensor arrangement having one or more motion sensors which are disposed e.g. at different locations on the end device, e.g. on the bottom left, top left, bottom right, top right, middle right, middle left, top middle, bottom middle, etc.; a camera arrangement having one or more cameras, a microphone arrangement having one or more microphones, a contactless interface, in particular NFC interface or Bluetooth interface.

As an input interface on the end device there is electively provided a keyboard, in particular a hardware keyboard having physical keys or a soft keyboard displayable on a touch-sensitive display of the end device.

The end device electively has a trusted execution environment which is controllable by a secure operating system and in which security software is implemented through which the sensor or sensors can be hindered from capturing or passing on the respective sensor variable. The thus achieved control of the sensor deactivation from the trusted execution environment by means of the security software ensures that the sensor deactivation is really carried out and not secretly prevented, unnoticed by the user of the end device.

Electively, the security software in the end device comprises PIN input software implemented in the trusted execution environment, in particular a PIN input application or a PIN input driver. Through the PIN input software, the end device is monitorable for impending input of an access code. The end device has, for every sensor that is hinderable from capturing or passing on its sensor variable, a sensor driver through which the capturing and passing on of the sensor variable with the sensor is controllable. In normal operation the sensor is thus controlled by the sensor driver in terms of software at the hardware level. The sensor drivers are controllable according to the invention by the PIN input software. The control is in particular preferably designed such that, as soon as an impending input of an access code is recognized by the PIN input software, the PIN input software causes the sensor drivers to be so controlled that the sensors are hindered from capturing or passing on the respective sensor variable.

An impending PIN input is recognizable to the end device for example by a request to input an access code being outputted to the user via a (user) interface (e.g. display) of the end device. In the overall sequence, the security software is thus prompted to deactivate the sensors or otherwise hinder them from capturing or relaying their sensor variable e.g. as soon as a request to input the access code is outputted by the end device via the (user) interface (e.g. display).

The PIN input software is electively designed as a PIN input driver, with the sensor drivers being controllable at the hardware level by the PIN input software, in particular via a bus connection, in particular an I2C bus or SPI bus connection. Sensors are hardware elements that are usually actuated at the hardware level, e.g. via an I2C bus or SPI bus or another suitable bus connection. Hardware elements are usually controlled by drivers. Accordingly, the sensors are controlled by sensor drivers. A keyboard is likewise a hardware element, and is hence preferably controlled by a driver, namely, the keyboard driver, preferably at the hardware level, e.g. via a bus connection, e.g. an I2C bus or SPI bus. In an embodiment where the security software has a PIN input driver as a monitoring element, all control softwares are thus designed as drivers and connected at the hardware level, e.g. via a common bus connection.

PIN input software in the form of a driver thus makes the implementation of the invention especially efficient and simple structurally.

Electively, the sensor drivers are deactivatable by the PIN input software and thereby hinderable from delivering data.

An end device having a trusted execution environment is electively designed as follows. Electively, the respective sensor driver has an insecure sensor driver implemented outside the trusted execution environment, and a secure sensor driver implemented within the trusted execution environment. The sensor drivers within and outside the trusted execution environment can have an identical or different range of functions. Electively, at least the insecure sensor driver is deactivatable by the PIN input software. By this means it is obtained that the sensor is put under the control of the PIN input software under the exclusive control through the trusted execution environment. From outside the trusted execution environment, in contrast, the sensor is no longer actuatable. Alternatively, the sensor is fully deactivated.

BRIEF DESCRIPTION OF THE DRAWINGS

Hereinafter the invention will be explained more closely by means of exemplary embodiments and with reference to the drawing, in which are shown:

FIG. 1 an end device according to an embodiment of the invention;

FIG. 2 a typical numeric block of a keyboard of an end device;

FIG. 3 a two-tier runtime architecture in an end device according to an embodiment of the invention.

DETAILED DESCRIPTION OF VARIOUS EMBODIMENTS

FIG. 1 shows an end device according to an embodiment of the invention, e.g. a mobile telephone or smartphone, in which a trusted execution environment TEE (trusted execution environment) is implemented. Via a keyboard KP (keypad) a PIN can be inputted as an access code for enabling the end device. The end device moreover has a digital camera CAM, and acceleration sensors BSE-OR, BSE-OL, BSE-UR, BSE-UL one in the vicinity of each of the four corners. The digital camera CAM and the four acceleration sensors BSE-OR, BSE-OL, BSE-UR, BSE-UL are uninvolved in the input of a PIN to the keyboard KP, but might unintentionally deliver feedback about the user's behavior upon the PIN input. Consequently, according to the invention, when the microprocessor of the end device outputs a request to input the PIN, the camera CAM and the four acceleration sensors BSE-OR, BSE-OL, BSE-UR, BSE-UL (and any further superfluous sensors) are automatically deactivated or hindered from being activated, and held in the deactivated state at least until the PIN input is terminated. FIG. 2 shows a typical keyboard KP for a mobile end device such as that from FIG. 1.

FIG. 3 shows a two-tier runtime architecture in the mobile end device from FIG. 1, according to an embodiment of the invention. The end device comprises a normal, intrusted execution environment NEE (normal execution environment), controlled by a normal operating system N-OS, and a trusted execution environment TEE (trusted execution environment), controlled by a secure operating system S-OS. In the normal, intrusted execution environment NEE, controlled by a normal operating system N-OS, there are implemented a camera driver DR-CAM for controlling the digital camera, and a BSE sensor driver DR-BSE for controlling the acceleration sensors BSE-OR, BSE-OL, BSE-UR, BSE-UL. In the trusted execution environment TEE, under the control of the secure operating system S-OS, there are implemented a keyboard driver DR-KP and a PIN input driver DR-PIN. The end device is monitored for PIN input by the PIN input driver DR-PIN. As soon as the keyboard KP is enabled for the input of a PIN and the user is requested to input the PIN via the keyboard KP, the camera driver DR-CAM and the BSE driver DR-BSE are deactivated by the PIN input driver DR-PIN even before the user is given the possibility to input the PIN, so that the camera CAM and the acceleration sensors BSE-* deliver no sensor variables to the microprocessor. The PIN input driver DR-PIN enables the camera CAM and the acceleration sensors BSE-* again only after the PIN input is terminated, at the earliest.

As indicated in FIG. 3 by the dashed boxes, the sensor drivers can optionally have a normal sensor driver DR-BSE or DR-CAM in the normal execution environment NEE and a secure sensor driver DR-BSE-S or DR-CAM-S in the trusted execution environment TEE. At least the insecure sensor drivers DR-BSE, DR-CAM are deactivated or held in the deactivated state upon PIN input. By this means the sensors BSE-*, CAM are not actuatable from the intrusted execution environment NEE, and only actuatable at most out of the trusted execution environment TEE.

The PIN input driver DR-PIN from FIG. 3 is designed as a driver at the hardware level and can thus communicate with the drivers DR-CAM, DR-BSE of the sensors directly at the hardware level, e.g. via the I2C bus, if an interface at the hardware level is provided between the normal and the unsecured runtime environment. Alternatively, the deactivation or prevention of activation of the sensors during the PIN input can be effected through a PIN application (i.e. at the application level) under the control of the secure operating system S-OS.

The invention claimed is:

1. A mobile end device comprising:
an input interface via which an access code is input, comprising at least one sensor,
a bus connection by which, during an input time period covering a process of inputting the access code to the input interface of the mobile end device, at least one or more sensors of the mobile end device that each capture a respective sensor variable and are uninvolved in the input of the access code can be hindered from capturing or passing on the respective sensor variable;
wherein the bus connection is further configured to hinder the one or more sensors from capturing or from passing on each respective sensor variable by separating the one or more sensors from a supply of power;
a trusted execution environment controlled by a secure operating system in which security software is implemented by which the one or more sensors are hindered from capturing or passing on the respective sensor variable, wherein the security software comprises PIN input software, implemented in the trusted execution environment by a PIN input application or PIN input driver, through which the mobile end device is monitored for impending input of the access code;
one or more sensor drivers for each of the one or more sensors, wherein the PIN input software controls the one or more sensor drivers by causing them to also hinder the one more sensors from capturing or passing on each respective sensor variable when the impending input of the access code is recognized by the PIN input software,
wherein each of the one or more sensor drivers comprises an insecure sensor driver implemented outside the trusted execution environment that the PIN input software can cause to be deactivated, and a secure sensor driver implemented within the trusted execution environment.

2. The end device according to claim 1, wherein the at least one or more sensors comprises at least one of the following: a motion sensor arrangement having one or more motion sensors, a camera arrangement having one or more cameras, a microphone arrangement having one or more microphones and a contactless interface.

3. The end device according to claim 1, wherein there is provided as an input interface a hardware keyboard having physical keys or a soft keyboard displayable on a touch-sensitive display of the end device.

4. The end device according to claim 1, wherein the PIN input software is designed as a PIN input driver, and wherein the sensor drivers are controllable at a hardware level by the PIN input software, via the bus connection.

5. The end device according to claim 1, wherein the one or more sensor drivers are deactivatable by the PIN input software.

6. The end device according to claim 1, wherein the access code is a PIN.

7. The end device according to claim 1, wherein each of the one or more sensor drivers are at least partly deactivated to hinder the one or more sensors from capturing or passing on the respective sensor variable.

8. The end device according to claim 1, wherein all sensors of the end device that are uninvolved in the input of the access code are hindered from capturing or passing on the respective sensor variable.

9. The end device according to claim 1, wherein every sensor that can be hindered from capturing or passing on the respective sensor variable can assume an activated state in which the one or more sensors capture and pass on the respective sensor variable, and can assume a deactivated state in which the one or more sensors are unable to capture or pass on the respective sensor variable, and wherein the one or more sensors are hindered from capturing or passing on the respective sensor variable by the end device ensuring that the one or more sensors are in the deactivated state during the input time period.

10. The end device according to claim 9, wherein upon the inputting of the access code on the input interface of the end device, the one or more sensors that are hindered from capturing or passing on the respective sensor variable are checked by the end device to determine whether the one or more sensors are in the activated state or in the deactivated state.

\* \* \* \* \*